UNITED STATES PATENT OFFICE.

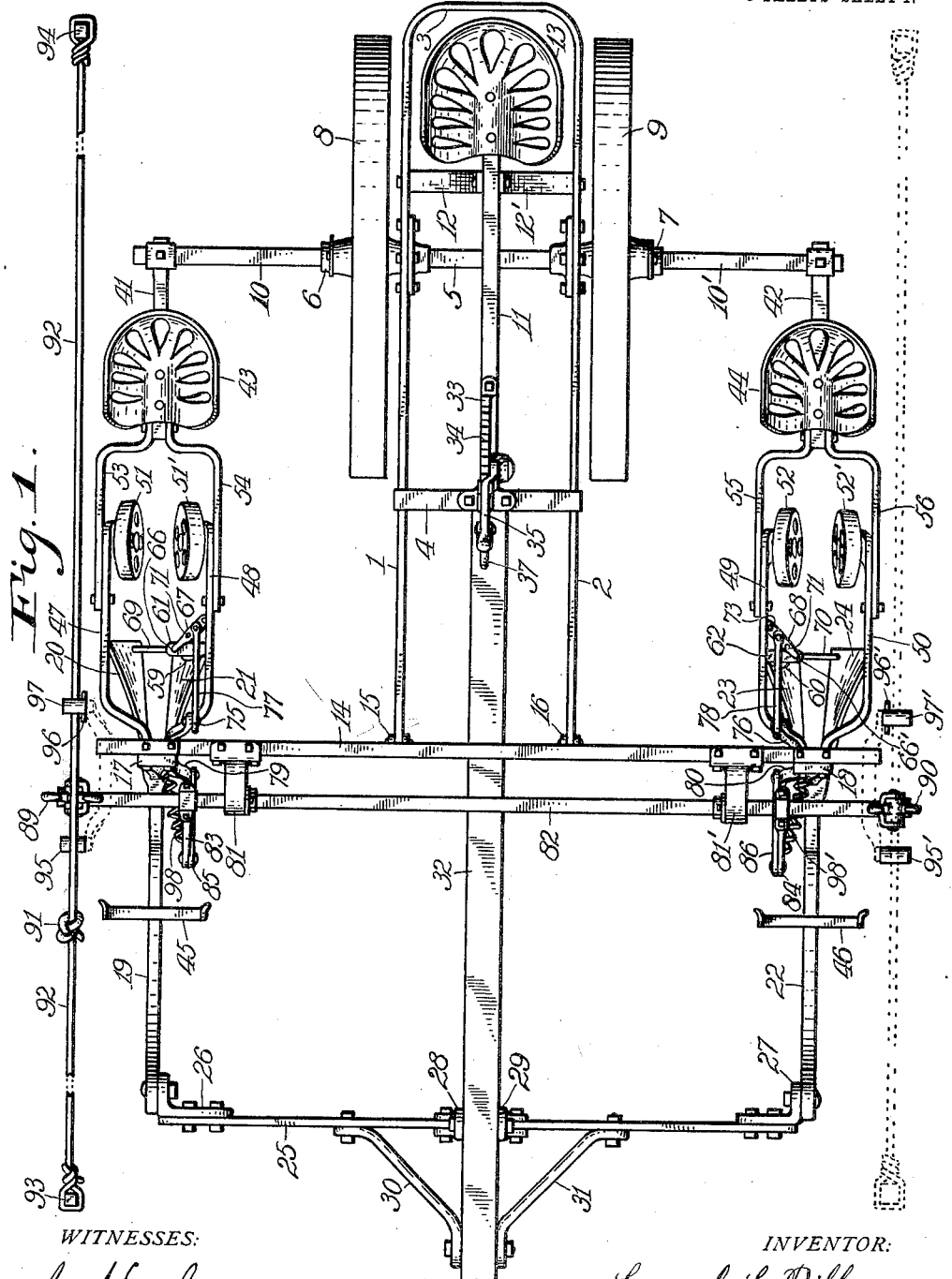

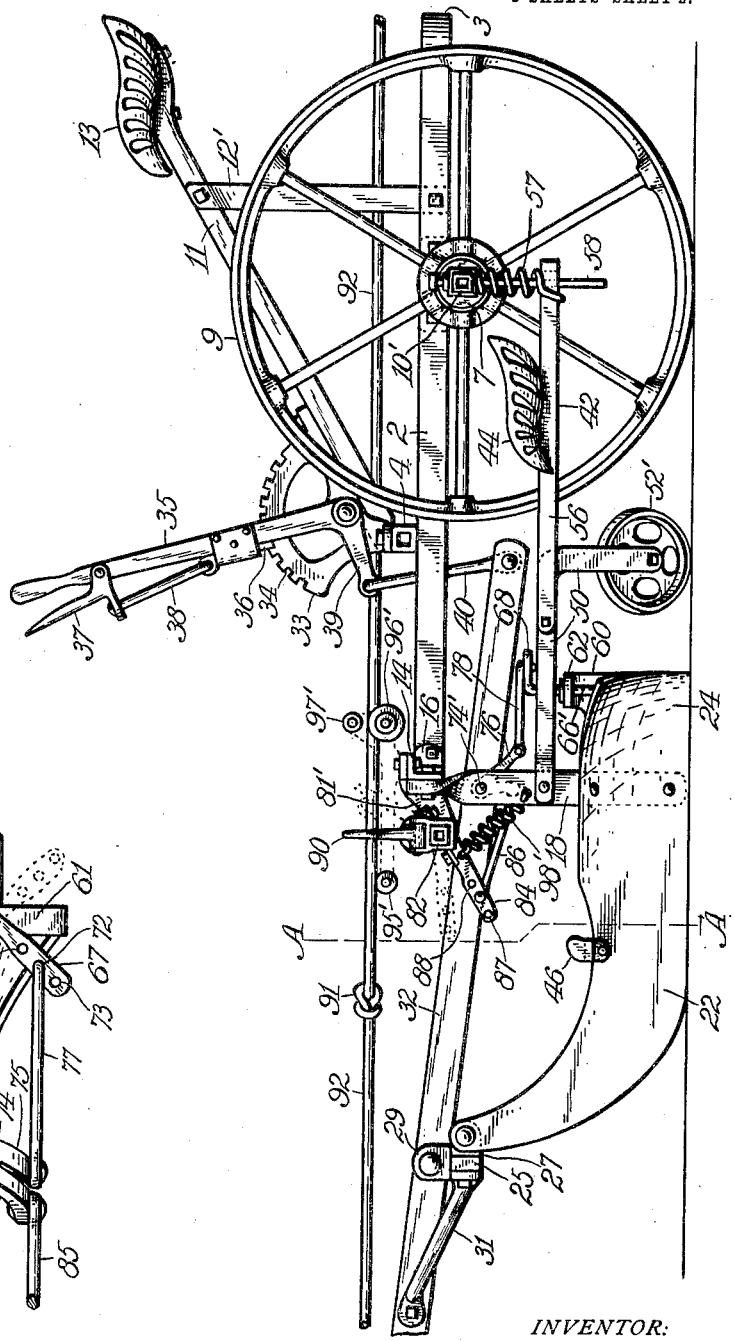

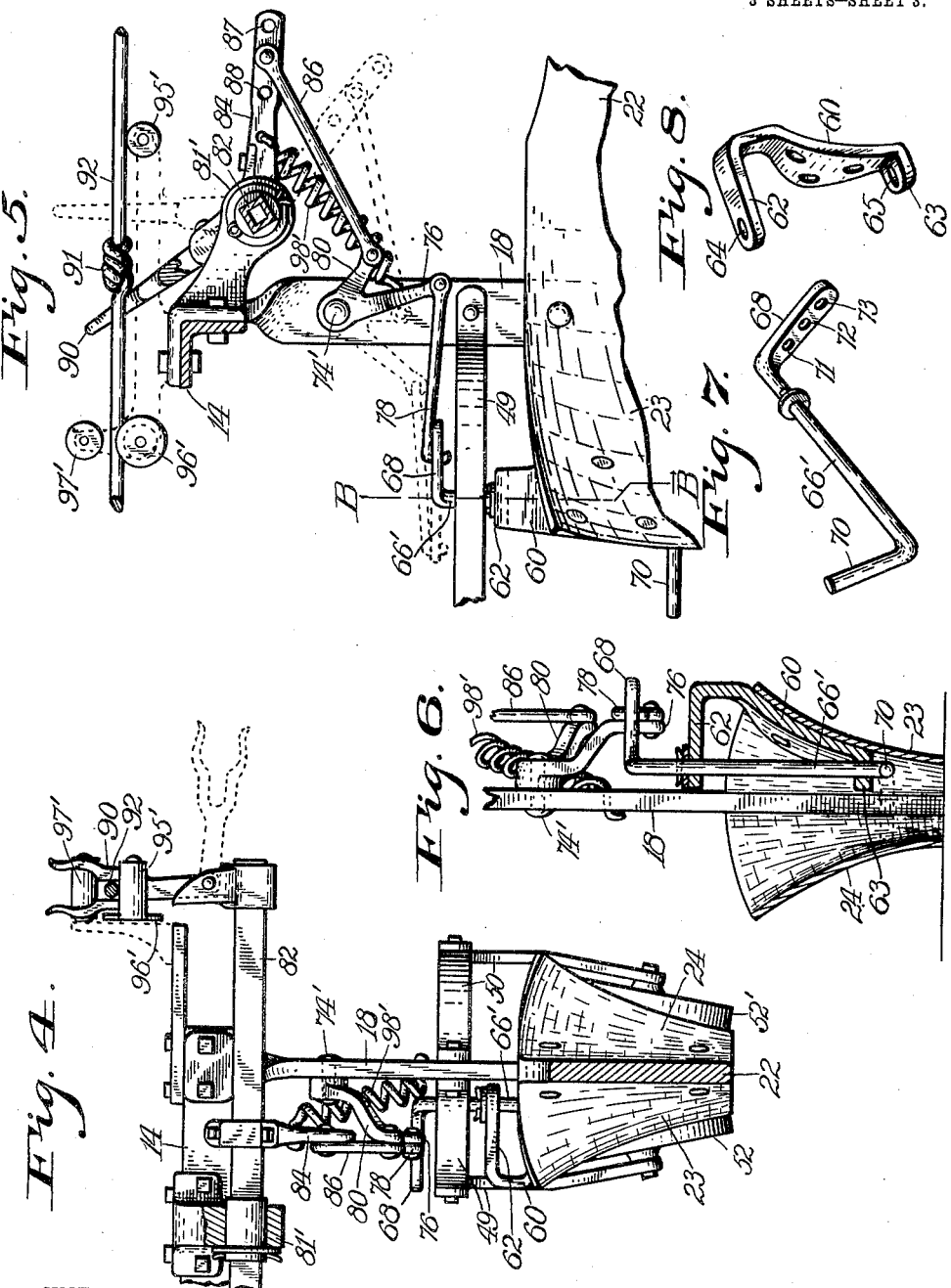

SAMUEL S. DILLOW, OF PERRY TOWNSHIP, MARION COUNTY, INDIANA.

CHECK-ROW PLANT-SETTER.

1,083,923. Specification of Letters Patent. Patented Jan. 13, 1914.

Application filed March 10, 1913. Serial No. 753,324.

*To all whom it may concern:*

Be it known that I, SAMUEL S. DILLOW, a citizen of the United States, residing in Perry township, in the county of Marion and State of Indiana, have invented a new and useful Check-Row Plant-Setter, of which the following is a specification, reference being had to the accompanying drawings and to the letters and figures of reference marked thereon.

This invention relates to a machine for setting plants that is designed to be used in connection with a wire having knots or buttons for determining the distances to set the plants apart in check rows, the invention having reference more particularly to a check row plant setter that is designed to be used for setting or transplanting tomato, cabbage, or other plants in two rows at a time.

An object of the invention is to provide an improved machine for setting plants accurately in check rows or for spacing plants equi-distantly apart in rows, a further object being to provide a check row plant setter that shall be so constructed as to enable operators to set plants with care and reliability and in an expeditious manner, which machine shall be durable and economical in use.

With the above mentioned and other objects in view, the invention consists in an improved plant setter provided with guiding and retaining devices for controlling the setting of plants and adapted to be controlled by a check row wire, the machine being adapted to be drawn over the ground by either animal or mechanical power.

The invention consists also in the novel parts and in the combinations and arrangements of parts as hereinafter particularly described and claimed.

Referring to the drawings, Figure 1 is a top plan of the machine as preferably constructed; Fig. 2, a top plan of one of the channel cutters of the machine partially broken away; Fig. 3, a side elevation of the machine; Fig. 4, a fragmentary section on the line A A in Fig. 3; Fig. 5, a view of the structure shown in Fig. 4 looking from left to right; Fig. 6, a fragmentary section on the line B B in Fig. 5; Fig. 7, a perspective view of one of the devices for controlling the timing of the plant setting; and Fig. 8 is a perspective view of the immediate support of the controlling device shown in the preceding figure.

In the different figures of the drawings similar reference characters indicate like parts or features of construction herein referred to and described.

In carrying out the objects and purposes of the invention, the main frame and carrying portions of the machine are variously constructed and may from time to time be variously modified, a structure of familiar form being illustrated herein in order to fully describe and explain the nature and character of the invention. The structure suitable for the purpose includes a main frame comprising two longitudinal members 1 and 2 and a tail bar 3 formed integrally, a transverse bar 4 secured to the members 1 and 2 and an axle bar 5 rigidly secured also to the members 1 and 2, the axle-bar having two wheel bearings 6 and 7 thereon on which a pair of carrying wheels 8 and 9 are rotatably mounted. The axle-bar 5 extends outward beyond the wheel bearings and forms frame members 10 and 10'. The carrying wheels are suitably spaced apart so that they may travel between two rows of plants spaced at a desirable distance apart. The axle extensions 10 and 10' are suitable for supporting or partially supporting seats for the operators who place the plants in the required positions in the ground. A seat arm 11 is secured to the transverse bar 4 and extends upward and rearward and is provided with supporting legs 12 and 12' that extend downward therefrom divergently and are secured to the members 1 and 2 respectively, a driver's seat 13 being mounted upon the upper portion of the arm 11. The frame comprises also a transverse member 14 which is provided with a pair of hinge members 15 and 16 that are hingedly connected to the forward ends of the members 1 and 2. Two frame members 17 and 18 are secured at a suitable distance apart in vertical arrangement to the member 14 and extend downward therefrom. A channel cutter, which is runner shaped so as to form a cutting blade 19, has two diverging blades or mold boards 20 and 21 formed thereon and is secured to the member 17, and a similar channel cutter comprising a blade 22 and diverging blades or mold boards 23 and 24 is secured to the member 18, the diverging blades extending rearward from the cutting blades so as to spread the earth outward on both sides of the channels cut by the blades 19 and 22, the diverging blades being relatively long and having upper rearward portions that flare outwardly in order to prevent the earth from falling back into the channel when plants are being set in the space between the blades of the several pairs.

A suitable forward end bar 25 is provided and its opposite ends are provided with connecting members 26 and 27 respectively that are suitably connected respectively to the forward upturned ends of the cutting blades 19 and 22. The bar 25 is provided also with suitable fittings 28 and 29 and two braces 30 and 31 that are connected to a pole 32, the machine being drawn and guided by the pole, the forward end of the pole obviously being hitched to draft animals or to a power machine to be supported thereby at a suitable distance from the ground in order to determine the depth of the channels in which the plants are set, and the depth may be varied or the channel cutters may be lifted from the ground when the machine is traveling on roads by means of suitable apparatus such as a quadrant 33 rigidly mounted on the transverse bar 4 and the seat arm 11 and provided with notches 34, a lever 35 being pivotally supported and provided with a latch 36 to enter either one of the notches. The lever is provided with a latch handle 37 that is connected by means of a link 38 with the latch. The lever has an arm 39, and a link 40 is connected to the arm and to the rear end portion of the pole 32 so that when the lever is drawn rearward the rear end of the pole will be drawn up toward the plane of the members 1 and 2, the channel cutters thus being elevated, and obviously the cutters are lowered when the lever is moved forward. Two seat beams 41 and 42 are suitably connected with the extensions 10 and 10'' respectively, and respectively support two seats 43 and 44 for the use of those who set the plants. The tops of the cutter blades 19 and 22 are provided with foot rests 45 and 46 respectively for the feet of the operators or attendants.

A channel closer frame comprises two members 47 and 48 that are connected to the frame member 17 and extend outward and rearward therefrom, and two similar frame members 49 and 50 connected to the member 18 and extending outwardly and rearwardly therefrom, said channel closer frame members extending also downwardly, the members 47 and 48 having rollers 51 and 51' mounted thereon, the members 49 and 50 having similar rollers 52 and 52' mounted thereon, respectively. The axes of the rollers are inclined so that the upper portions of each pair of rollers are farther apart than the lower portions that roll on the ground for pressing the earth back into the channels after the plants are set. Two seat frame members 53 and 54 are suitably connected to the members 47 and 48 respectively, preferably so as to permit a limited extent of relative pivotal movement, and the members 53 and 54 are rigidly secured to the beam 41. Similar seat frame members 55 and 56 are suitably connected to the members 49 and 50 and are rigidly secured to the beam 42. Preferably the rear end of each beam 41 and 42 is yieldingly supported by means of a spring 57 and guided by means of a guide rod 58 connected with the extension 10 or 10'.

In order to accurately control and determine spacing and relative positions of the plants in the ground, one of the pair of flaring blades of one of the channel cutters is provided with a suitable base plate 59, and one of the remaining pair of similar flaring blades is provided with a base plate 60. One of the base plates has an arm 61 thereon and the other plate has an arm 62 thereon, the arms being slightly higher than the blades, the lower portion of each base plate having an ear 63 thereon. Each arm 61 and 62 has a shaft-bearing 64 therein and each ear has a similar shaft-bearing 65 therein, the shaft-bearing being adapted to guide a vertical shaft on the rearward inner portion of the flaring blade and at one side of the vertical plane of the cutter blade 19 or 22, a shaft 66 being thus mounted by means of the shaft-bearings on one of the blades, a similar shaft 66' being similarly mounted on one of the blades of the remaining pair. Preferably one shaft is mounted on the inner blade 21 of one pair and another shaft mounted on the inner blade 23 on the remaining pair of flaring blades, and the shafts are provided preferably on their upper ends with operating arms 67 and 68 respectively, and on their lower ends with fingers 69 and 70 respectively that perform the functions of gates and also indicators or guides for controlling the setting of the plants. Preferably each operating arm of the shaft has a plurality of pivot holes 71, 72, 73 therein. The members 17 and 18 are provided with pivots 74 and 74' respectively on each of which a bell-crank is mounted. The bell-cranks have arms 75 and 76 respectively to which two coupling rods 77 and 78 are connected respectively, the rods being connected respectively to the operating arms 67 and 68. The bell-cranks have also arms 79 and 80 respectively for controlling them. Two brackets 81 and 81' are secured to and extend forwardly from the transverse frame member 14 in proximity to the members 17 and 18 and rotatably support a rock shaft 82 to which two arms 83 and 84 are secured so as to extend downwardly and forwardly in normal position, the arms being connected by means of rods 85 and 86 to the arms 79 and 80 respectively. Each arm 83 and 84 preferably has a plurality of pivot holes 87, 88 therein so that the rod 85 or 86 may be adjustably connected thereto. The fingers 69 and 70 normally extend across the space between the two of the pair of flaring blades at the rear end portions thereof and the plants when placed against the forward sides of the fingers are carried along until the fingers swing back on operation of the rock shaft 82. Two suitable trip arms 89 and 90 are mounted on the rock shaft 82 on opposite end portions thereof respectively, one of the types commonly used on corn planters being suitable for the purpose so as to be tripped by means of knots or buttons 91 fixed on a wire 92 which, as will be understood, is attached to anchors or posts 93 and 94, the wire being stretched so as to be parallel with the proposed row of plants. For guiding the wire relative to the trip arm the machine is provided with guide rollers 95 and 95' and also rollers 96 and 96' that hold up the wire, other guide rollers 97 and 97' being suitably supported above the wire on opposite sides of the machine respectively. The trip arms are retracted and held in normal rest position by means of a suitably supported spring, preferably two springs 98 and 98' being employed, one spring being connected to the arm 83 and to the frame member 17, the other spring being connected to the arm 84 and to the frame member 18. The means for supporting and guiding the wire being well known requires no description in detail and may be variously modified.

In practical use the machine is drawn forward and two operators who may be boys occupy the seats 43 and 44 and afford the necessary weight for holding down the rollers that close the channels or furrows in which the plants are set. A supply of plants is carried in any suitable manner as may be preferred and while the channels are cut by the blades 19 and 22 and opened by the flaring following blades, the operators place the plants in proximity to the ground, each operator holding a plant in one hand against the forward side of a controlling finger as 69 between the blades 20 and 21, and as the machine advances and the trip lever is operated on coming in contact with a knot 91, the knots being spaced the required distance apart, the rock shaft 82 is rotated and consequently both fingers 69 and 70 are swung back to release the plants or rather to permit the machine to be drawn away from the plants which are pushed down into the channels by the operators at the moment that the fingers swing backward out of the way, the plants being fixed in the ground by the following rollers while held uprightly by the operators. This, as will be seen, enables the operators to set the plants into the ground at correct distances apart for check row cultivating.

Having thus described the invention, what is claimed as new is—

1. A plant-setter including a movable channel-cutter provided on its rear portion with a movable indicator, and means for periodically moving the indicator during movement of the channel-cutter.

2. A plant-setter including a channel-cutter comprising two diverging blades provided with a movable gate device extending across the space between the ends of the two blades, and controlling means for the gate device.

3. A plant-setter including a channel-cutter and opener provided on the rear portion thereof with movable means for retaining a plant therein, and means mounted on the channel-cutter and opener for assisting in controlling the movable means.

4. A plant-setter including a movable channel-cutter provided on its rear portion with a movable gate device for retaining a plant within the channel-cutter, and means automatically acting during movement of the channel-cutter to move the gate device to release the plant.

5. A check row plant setter including a movable frame, a channel-cutter including two opener devices and connected with the frame, movable controlling means supported at the rear of the channel-cutter between the opener devices adapted for temporarily retaining a plant between the devices, and means automatically acting during movement of the channel-cutter and adapted for moving the controlling means in measured periods for releasing the plant.

6. A plant-setter including a channel-cutter comprising two diverging and flaring blades, one of the blades having shaft-bearings thereon, and a shaft rotatably mounted in the shaft-bearings and having a finger thereon normally extending substantially across the space between the two blades, the shaft having also an operating arm thereon.

7. A plant-setter including carrying wheels, channel-cutters, a frame mounted on the wheels and the channel-cutters, plant-setting controlling means movably mounted on the rear portions of the channel-cutters, a rock-shaft mounted on the frame and operatively connected with the controlling means, two series of wire-guides mounted on the frame, and two trip-arms mounted on the rock-shaft in proximity to the two series of the wire-guides respectively and provided with a retracting-spring.

8. A plant-setter including a frame, a channel-cutter connected to the frame and comprising two diverging and flaring mold-boards, one of the mold-boards having shaft-bearings on the inner side thereof, a shaft rotatably mounted vertically in the shaft-bearings and having a finger thereon normally extending to the remaining one of the mold-boards to be moved therefrom, the shaft having also an operating arm thereon, a bell-crank mounted on the frame, a rod connected to the bell-crank and the operating arm, a rock-shaft mounted on the frame and having an arm thereon, a rod connected to the arm of the rock-shaft and also to the bell-crank, a trip-arm mounted on the rock-shaft, and a retracting spring connected to the frame and also operatively connected with the rock-shaft.

In testimony whereof, I affix my signature in presence of two witnesses.

SAMUEL S. DILLOW.

Witnesses:
E. T. SILVIUS,
WILLIAM DILLOW.

---

Copies of this patent may be obtained for five cents each, by addressing the "Commissioner of Patents, Washington, D. C."